April 21, 1931. A. SEILING 1,802,092
INCUBATOR
Filed Sept. 11, 1929 2 Sheets-Sheet 2

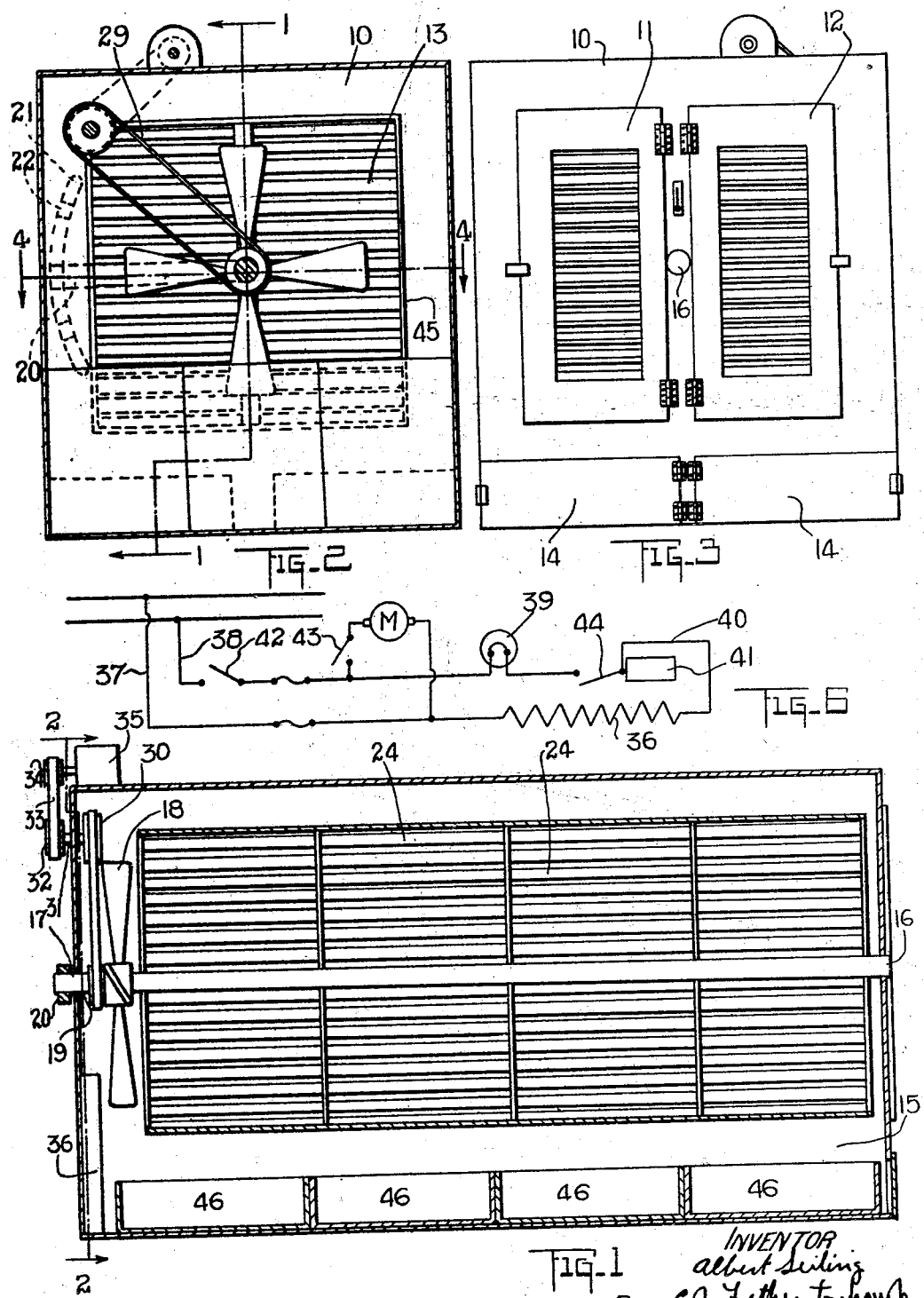

INVENTOR.
Albert Seiling
By E.J. Featherstonhaugh
ATTORNEY.

Patented Apr. 21, 1931

1,802,092

UNITED STATES PATENT OFFICE

ALBERT SEILING, OF ELMIRA, ONTARIO, CANADA

INCUBATOR

Application filed September 11, 1929. Serial No. 391,808.

The invention relates to new and useful improvements in incubators, as described in the present specification and illustrated in the accompanying drawings which form part of same.

The invention consists essentially of the novel features pointed out broadly and specifically in the claims for novelty following a description containing an explanation in detail of an acceptable form of the invention.

The objects of the invention are to furnish an incubator that will have a continuous and even circulation of the heated air throughout and thereby bring the air into direct contact with each egg; to facilitate the changing of the positions of the egg trays from a horizontal plane instead of from the usual vertical plane; to reduce to a minimum the number of failures in hatching eggs and to prevent any air pockets at any point within the frame through the proper circulation mentioned hereinbefore; to increase the output of incubating plants and reduce the labor and consequently the cost of production; and generally to provide an incubator durable in construction, attractive in appearance and comparatively cheap in manufacture.

In the drawings, Figure 1 is a longitudinal sectional view of the incubator taken on lines 1—1 in Figure 2, showing the bearing shaft and operating mechanism in full.

Figure 2 is a cross sectional view of the incubator taken on lines 2—2 in Figure 1.

Figure 5 is a perspective view of the frame and the brooder trays.

Figure 6 is a diagrammatic view of the electrical connection.

Like numerals of reference indicate corresponding parts in the various figures.

Figure 3:
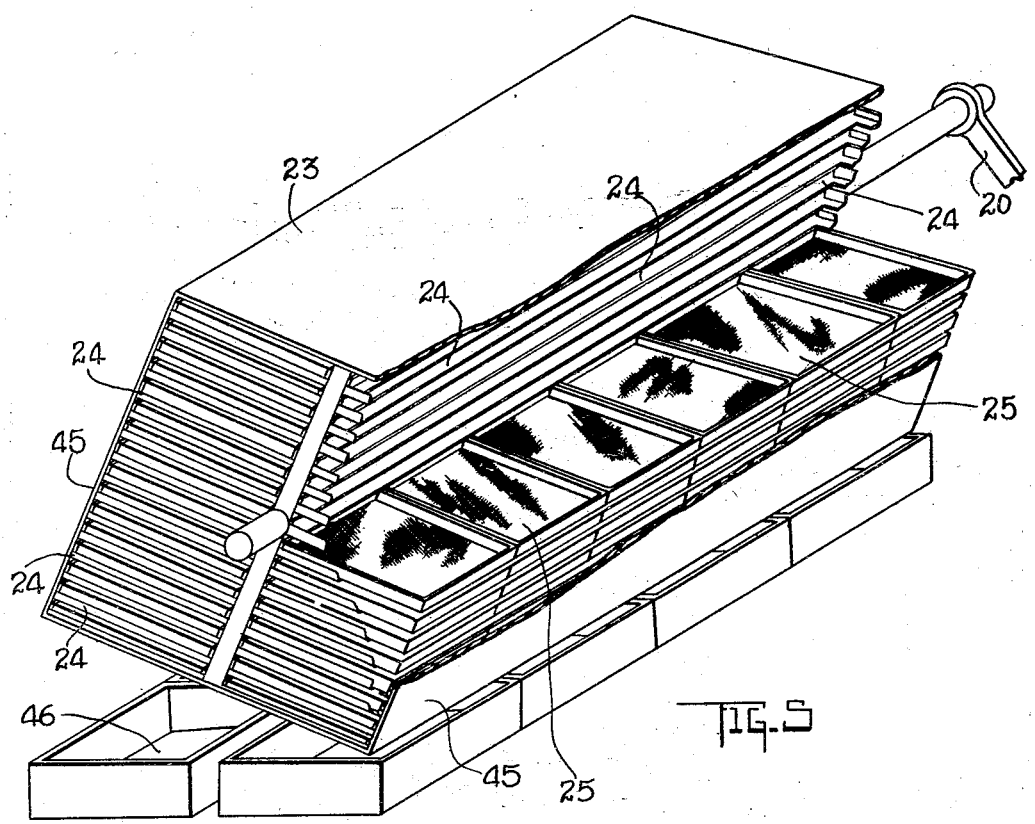
Figure 3 is a front elevational view of the incubator.
Figure 4:
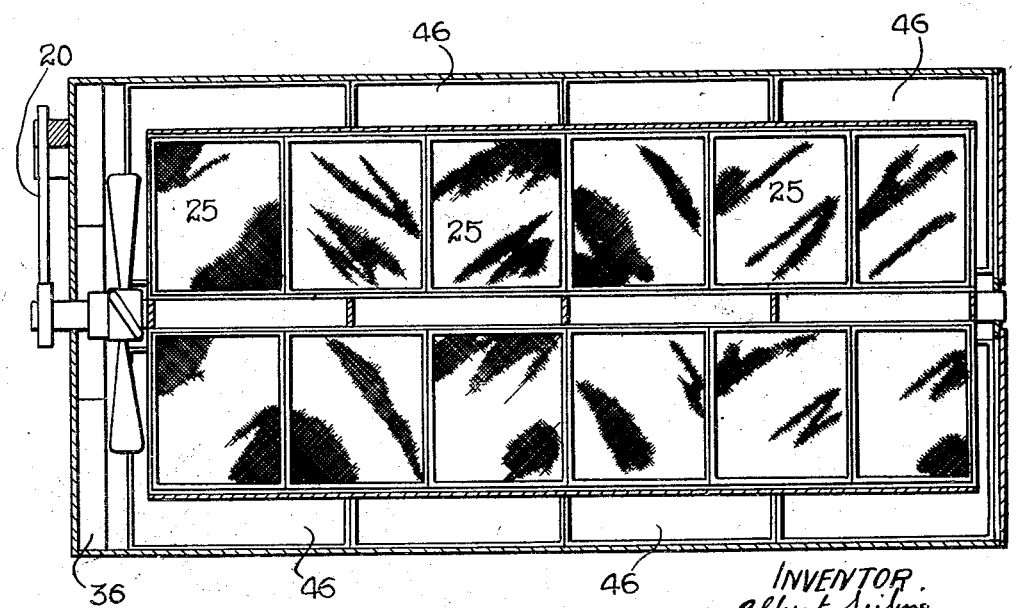
Figure 4 is a sectional plan view of the incubator taken on lines 4—4 in Figure 2, showing the bearing shaft and fan in full.

Referring to the drawings, the incubator casing is indicated by the numeral 10, having the doors 11 and 12 leading into the tray compartment 14, and the doors 15 therebeneath leading into the hatcher compartments.

The casing 10 has the bearing members 16 for the longitudinal bearing shaft 17 journalled in the end walls of the casing. This bearing shaft 17 at the rear end has the fan 18 journalled thereon and the pulley 19 adjacent thereto which is fixedly connected to the fan member 18. The bearing shaft projects through the rear wall of the casing and is secured to the lever 20 having a spring latch adapted to engage the quadrant 21 in the notches 22.

The tray compartment 14 contains the frame 23 having the tray racks 24. The frame 23 is securely fastened to the longitudinal bearing shaft 17 and is movable from a horizontal plane either to the left or right through the operation of the lever being adjusted by the various notches of the quadrant. The tray racks 24 support the egg trays 25 which may be either of a single length extending from one end to the other of the rocking frame 23 or in two or more lengths, according to the requirements and size of the incubator.

The fan 18 is operated by the belt 29 trained over the pulley 19 and the pulley 30 secured to the shaft 31 jouralled in the rear wall of the casing and carrying the pulley 32 driven by the belt 33 trained over the driving pulley 34 connected to the motor 35.

The heater 36 is secured on the inside of the lower portion of the end wall and is connected to a suitable source of energy by the wires 37 and 38 and to a light 39 by the wiring 40 including the thermostats 41. The main switch 42 controls the supply of electric current for both the motor circuit and the heater circuit while the individual switch 43 cuts in and out the motor and the individual switch 44 cuts in and out the heater.

The rocker rack frame 23 is tubular and is closed in at the sides by the surrounding walls 45 leaving the ends open to exposure. The heater and the pulley and other operating mechanism are all connected to the rear wall of the casing and when it is desired to take the incubator apart, all that is necessary is to remove the rear wall and pull out the longitudinal shaft from the front end and thereby leave the whole rack frame free to be removed.

The brooder trays 46 are slidably arranged in the bottom of the tray compartment 14 and in alignment with the lower portion of the heater. In this way it will be seen that the brooder compartment is exposed to the heat and upon the rotation of the fan, the air is heated and circulated throughout the casing. In other words, the air movement is stimulated by the fan and flows through the tubular frame in a circulatory movement in a continuous stream, thoroughly warming the contents of the racks at a temperature adjusted by means of the thermostat.

When the air is overheated the thermostat automatically switches off the heater and the electric light which is extinguished, and when the air is cooler the thermostat automatically switches on the heater and the electric bulb. During the process the motor is continually operated so that the circulation of the air is continuous and in that way there is no dead spot or air pocket throughout the whole of the casing.

What I claim is:

1. In an incubator, a stationary casing having a brood chamber and a rack chamber, a tubular rack frame having open front and rear ends and a casing closing in the sides of the tubular rack frame the latter being rockably supported in said casing, a heater and fan secured to the inside of one of the end walls in the stationary casing facing one of the open ends of said rack frame for stimulating the flow of air through said stationary casing and ensuring a circulatory movement through the rack frame and around the sides thereof.

2. In an incubator, a stationary casing having doors leading into a brood chamber and a rack chamber, a tubular rack frame having open front and rear ends and a casing closing in the sides thereof said rack frame being rockably supported in said stationary casing with its front open end facing the doors in the stationary casing and the rockably supporting means being pivoted to the front and rear walls of said casing, a heater and fan stimulating the flow of air throughout said casing around the closed walls of said rack frame and through the open ends thereof and ensuring a circulatory movement through the rack frame and around the sides thereof.

Signed at the town of Elmira this 20th day of July, 1929.

ALBERT SEILING.